United States Patent [19]
Stringer et al.

[11] 3,772,042

[45] Nov. 13, 1973

[54] MOLYBDENUM SILICIDE BONDED BORON CARBIDE

[76] Inventors: Robert Kenneth Stringer, 87 Studley Rd., Heidelberg, Victoria; Neil Alexander McKinnon, 22 Stephens St., North Balwyn, Victoria; Lloyd Stuart Williams, 206 Kooyang Rd., Toorak, Victoria, all of Australia

[22] Filed: Apr. 14, 1972

[21] Appl. No.: 244,242

[30] Foreign Application Priority Data
Apr. 14, 1971 Australia................................ 4588

[52] U.S. Cl........................ 106/43, 51/307, 75/204, 106/55
[51] Int. Cl.. C04b 35/56, C04b 35/58, C04b 35/70
[58] Field of Search ................ 51/307; 75/201, 204; 106/43, 44, 55, 56; 252/516

[56] References Cited
UNITED STATES PATENTS

| | | | |
|---|---|---|---|
| 2,582,231 | 1/1952 | Catallo............................. | 75/204 X |
| 3,141,768 | 7/1964 | Bard et al. ........................... | 75/204 |
| 3,306,741 | 2/1967 | Lallemant............................ | 75/204 |
| 3,325,300 | 6/1967 | Wise .................................. | 106/43 X |
| 2,982,619 | 5/1961 | Long..................................... | 106/55 |
| 3,343,373 | 9/1967 | Henderson et al.................. | 258/516 |
| 3,353,954 | 11/1967 | Williams ............................. | 75/201 |
| 3,199,993 | 8/1965 | Schrewelius ..................... | 51/307 X |

FOREIGN PATENTS OR APPLICATIONS

| | | | |
|---|---|---|---|
| 936,118 | 9/1963 | Great Britain....................... | 106/44 |

OTHER PUBLICATIONS

Samsonov et al. "Alloys of the Boron Carbide–Molybdenum Disilicide System" Chem. Abstracts–Jan. 9, 1961– 314i

*Primary Examiner*—Helen M. McCarthy
*Attorney*—Richard C. Sughrue and Gideon Franklin Rothwell et al.

[57] ABSTRACT

An abrasion resistant composition comprising between 40 and 60 percent by volume of boron carbide in particulate form, dispersed in a matrix of molybdenum disilicide.

2 Claims, No Drawings

MOLYBDENUM SILICIDE BONDED BORON CARBIDE

This invention relates to abrasion resistant compositions and to articles made from such compositions. The abrasion resistant compositions of this invention find particular application in nozzles for the passage of high velocity streams of, or containing, abrasive materials, for example gas streams containing abrasive particles such as are used in sand-blasting and like operations. They are also useful in grinding wheels, wheel dressing sticks, filament thread guides and the like.

According to this invention there is provided an abrasion resistant composition comprising from 40 to 60 percent by volume of boron carbide in particulate form dispersed in a matrix of molybdenum disilicide.

The preferred compositions of this invention contain from 48 percent to 58 percent by volume of boron carbide. The boron carbide particles preferably range in size from 200 mesh to 400 mesh BSS.

It is known to produce abrasion resistant materials by embedding a hard material in a matrix of a softer material, for example cobalt-bonded tungsten carbide. It is also known that boron carbide is a hard material with a high resistance to abrasion and that this substance can be incorporated into suitable matrices to form an abrasion resistant article. However, we have found that in order to produce a product which has a maximum resistance to abrasion it is important to select the correct matrix material and to ensure that the two substances are present in certain proportions. Our investigations have shown that molybdenum disilicide is the most suitable matrix material, both from the point of view of fabrication (as will be described hereinafter) and for the production of an article which takes greatest advantage of the abrasion resistant properties of boron carbide. The degree of abrasion resistance from such an article is highly dependent on the proportion of the constituents present; thus, articles formed with less than 40 percent boron carbide or more than 60% boron carbide do not perform as well as articles containing the proportions of boron carbide specified above.

The abrasion resistant composition of the invention may be produced by any suitable technique. For example a mixture of boron carbide and molybdenum disilicide, in particulate or powdered form may be "hot-pressed", i.e. moulded under heat and pressure, to the desired form. However, to ensure that the composite material has maximum mechanical strength and abrasion resistance the material is preferably produced by the technique of "reaction pressing" which is described in our Australian patent No. 247495 and U.S. Pat. No. 3,353,954. In this method particulate boron carbide in mixed with the finely divided elemental constituents of molybdenum disilicide and the mixture is placed in a mould of the desired shape. Pressure is applied to the material in the mould while the mixture therein is heated to the point where a rapid reaction between the molybdenum and silicon occurs. During the reaction a contraction in the volume of the mixture will occur and it is important to ensure that a uniform pressure is maintained on the mixture during this event.

Generally, it is preferred to have the molybdenum and silicon present in the stoicheiometric proportions necessary to form $MoSi_2$. However, proportions other than stoicheiometric may be used.

Thus, in accordance with a further aspect of the invention, there is provided a method for producing an abrasion resistant article which comprises forming a mixture containing 40 to 60 percent by volume of boron carbide the balance consisting of finely divided molybdenum and silicon and subjecting the mixture to heat and pressure in a mould such that molybdenum disilicide is formed in situ and a moulded article is formed.

Preferred reaction conditions are a temperature between 1,500°C. and 1,650°C. and a pressure of at least 6,000 lb/sq. in. The maximum pressure is limited only by the bursting strength of the graphite die material.

The invention is illustrated but not limited by the following examples.

EXAMPLE 1

An airpipe tip for use in a flotation cell for the treatment of lead/zinc ores was produced by mixing 58 percent by volume of 320 mesh boron carbide ($B_4C$) with Mo and Si in the stoicheiometric proportions for $MoSi_2$. The mixture was placed in a suitably shaped die and heated to 1,650°C. for 45 minutes under a pressure of 8,000 psi, applied by a plunger. Airpipe tips of this type are subject to considerable wear due to the abrasive action of the ore particles in the surrounding liquid. The tip produced as above showed superior wear resistance to tips made of conventional materials.

EXAMPLE 2

A grit or sand blast nozzle was prepared by mixing 58 percent by volume of $B_4C$ of half 320 mesh, half 500 mesh with Mo and Si in the proportions for $MoSi_2$, pressing the mixture into a suitably shaped die at 8,000 psi and heating to 1,650°C. for 45 minutes while under pressure.

EXAMPLE 3

A grit blast nozzle was prepared by the method of Example 2, using 54 percent by volume of 100 mesh $B_4C$ and a temperature of 1,500°C.

EXAMPLE 4

A grit blast nozzle was prepared by the method of Example 2, using 58 percent by volume of 325 mesh $B_4C$ of high boron content and a temperature of 1,650°C.

The nozzles of each of Examples 2 to 4 showed no appreciable wear after 400 hours of use. Conventional bonded tungsten carbide nozzles used under the same conditions were worn out after 40 hours use.

We claim:

1. An abrasion resistant composition consisting essentially of between 40 and 60 percent by volume of boron carbide in particulate form, dispersed in a matrix of molybdenum disilicide.

2. An abrasion resistant composition as defined in claim 1, in which the boron carbide is between 48 and 58 percent of the composition by volume, and the particles of boron carbide are substantially in the size range 200 mesh BSS to 400 mesh BSS.

* * * * *

UNITED STATES PATENT OFFICE
CERTIFICATE OF CORRECTION

Patent No. 3,772,042      Dated November 13, 1973

Inventor(s) Robert Kenneth STRINGER et al

It is certified that error appears in the above-identified patent and that said Letters Patent are hereby corrected as shown below:

IN THE HEADING:

Assignee's name omitted. Insert the following:

-- Commonwealth Scientific and Industrial Research Organization,
    Limestone Avenue, Campbell,
    Australian Capital Territory,
    Commonwealth of Australia --

Signed and sealed this 4th day of June 1974.

(SEAL)
Attest:

EDWARD M. FLETCHER, JR.          C. MARSHALL DANN
Attesting Officer                  Commissioner of Patents